US012602471B2

(12) United States Patent

Makovoz

(10) Patent No.: US 12,602,471 B2

(45) Date of Patent: Apr. 14, 2026

(54) ANOMALY DETECTION SYSTEM

(71) Applicant: CyberActive Technologies LLC,
Wilmington, DE (US)

(72) Inventor: David Makovoz, Silver Spring, MD
(US)

( * ) Notice: Subject to any disclaimer, the term of this
patent is extended or adjusted under 35
U.S.C. 154(b) by 633 days.

(21) Appl. No.: 17/955,391

(22) Filed: Sep. 28, 2022

(65) Prior Publication Data

US 2024/0104201 A1 Mar. 28, 2024

(51) Int. Cl.
*G06F 21/55* (2013.01)
*G06N 20/20* (2019.01)

(52) U.S. Cl.
CPC ........... *G06F 21/554* (2013.01); *G06N 20/20*
(2019.01); *G06F 2221/034* (2013.01)

(58) Field of Classification Search
CPC . G06F 21/554; G06F 2221/034; G06N 20/20;
G06N 3/044; G06N 3/045
See application file for complete search history.

(56) References Cited

U.S. PATENT DOCUMENTS 8,862,259 B2 * 10/2014 Kobayashi ............... G11B 5/85
700/121
11,057,414 B1 * 7/2021 Giorgio ............... H04L 63/1416

| 11,100,688 | B2 * | 8/2021 | Epasto | .................... | G06T 9/001 |
| 2009/0287335 | A1 * | 11/2009 | Kobayashi | .............. | C23C 14/54 |
| | | | | | 700/103 |
| 2017/0063910 | A1 * | 3/2017 | Muddu | ................ | G06F 3/0482 |
| 2018/0351981 | A1 * | 12/2018 | Muddu | ................ | G06N 20/00 |
| 2020/0035002 | A1 * | 1/2020 | Epasto | ..................... | G06T 9/00 |
| 2023/0351215 | A1 * | 11/2023 | Sun | ........................ | G06N 5/022 |

FOREIGN PATENT DOCUMENTS

| CN | 107045283 B | * | 2/2021 | .......... G05B 13/042 |
| JP | 2021174410 A | * | 11/2021 | |

OTHER PUBLICATIONS

Najafi, Pejman, and et al. "MalRank: a measure of maliciousness in
SIEM-based knowledge graphs." In Proceedings of the 35th annual
computer security applications conference, pp. 417-429. 2019 (Year:
2019).*

* cited by examiner

*Primary Examiner* — Douglas Kay

(57) ABSTRACT

A system includes a computer. The computer includes a
processor and a memory. The memory includes instructions
such that the processor is programmed to: construct a
short-term graph based on data representing one or more
primary events, update a long-term graph to include ele-
ments from the short-term graph when a numerical repre-
sentation of the short-term graph deviates from a graph
profile, and determine whether a maliciousness probability
of the long-term graph exceeds an anomaly threshold.

11 Claims, 8 Drawing Sheets

ANOMALY DETECTION SYSTEM

BACKGROUND

Computer networks may include multiple computing assets that enable users to access shared resources including a variety of digital content accessible by a communication network. A computer network can be a set of computers connected to form one or more nodes within a personal area network, a local/virtual area network, a wide area network, or any other type of network architecture associated with a col lection of computing devices. Access to the Internet external to a particular network presents a variety of cyber security challenges. As such, computing assets within an example computer network may be susceptible to data breaches or attacks from malicious users seeking unauthorized access to one or more assets within the network.

SUMMARY

A system includes a computer. The computer includes a processor and a memory. The memory includes instructions such that the processor is programmed to: construct a short-term graph based on data representing one or more primary events, update a long-term graph to include elements from the short-term graph when a numerical representation of the short-term graph deviates from a graph profile, and determine whether a maliciousness probability of the long-term graph exceeds an anomaly threshold.

In other features, the processor is further programmed to generate an alert when the maliciousness probability exceeds the anomaly threshold.

In other features, the data representing one or more primary events comprises parsed log data.

In other features, the processor is further programmed to receive log data from at least one endpoint monitoring agent.

In other features, the processor is further programmed to determine whether the numerical representation of the short-term graph deviates from the graph profile using a machine learning module.

In other features, the machine learning module comprises a plurality of machine learning models configured as a machine learning ensemble.

A method comprises constructing a short-term graph based on data representing one or more primary events, updating a long-term graph to include elements from the short-term graph when a numerical representation of the short-term graph deviates from a graph profile, and determining whether a maliciousness probability of the long-term graph exceeds an anomaly threshold.

In other features, the method includes generating an alert when the maliciousness probability exceeds the anomaly threshold.

In other features, the data representing one or more primary events comprises parsed log data.

In other features, the method includes receiving log data from at least one endpoint monitoring agent.

In other features, determining whether the numerical representation of the short-term graph deviates from the graph profile using a machine learning module.

In other features, the machine learning module comprises a plurality of machine learning models configured as a machine learning ensemble.

A system includes a computer. The computer includes a processor and a memory. The memory includes instructions such that the processor is programmed to: construct a plurality of short-term graphs based on data representing one or more primary events, at least one of create or update a long-term graph to include elements from the short-term graphs when a numerical representation of the short-term graphs deviates from a learnt graph profile, and determine whether a maliciousness probability of any subset of the long-term graph exceeds an anomaly threshold.

In other features, the processor is further programmed to generate an alert when the maliciousness probability exceeds the anomaly threshold.

In other features, the processor is further programmed to update the maliciousness probabilities of at least one subset of the long-term graph.

In other features, the data representing one or more primary events comprises parsed log data.

In other features, the processor is further programmed to receive log data from at least one endpoint monitoring agent.

In other features, the processor is further programmed to determine whether the numerical representation of the short-term graph deviates from the graph profile using a machine learning module.

In other features, the machine learning module comprises a plurality of machine learning models configured as a machine learning ensemble.

In other features, the processor is further programmed to determine the numerical representation of the short-term graphs based on at least one of a betweenness centrality, a closeness centrality, an Eigenvector centrality, an edge connectivity, a node connectivity, a number of communities, a community size distribution, Node2vec embeddings, Deepwalk embeddings, or Deep Neural Networks for Learning Graph Representations (DNGR) embeddings.

DETAILED DESCRIPTION

The present disclosure describes an anomaly detection system that provides cyber threat detection functionality. Typically, cyber threat detection systems incorporate signature-based analysis and/or rules-based analysis. As described herein, a system can extract primary events from multiple sources, such as log files, Next Generation Firewalls (NGFW), intrusion detection systems (IDSs), endpoint detection and response (EDR) systems, application programming interfaces (APIs), cloud computing devices, or the like. The system can perform signatureless correlations of the primary events to detect anomalous activity, such as malicious activity. For example, the system can use graph techniques to perform signatureless correlation of primary events that can result in actionable alerts. A graph can comprise a collection of nodes and edges in which the edges represent relationships between the nodes.

Figure 1:
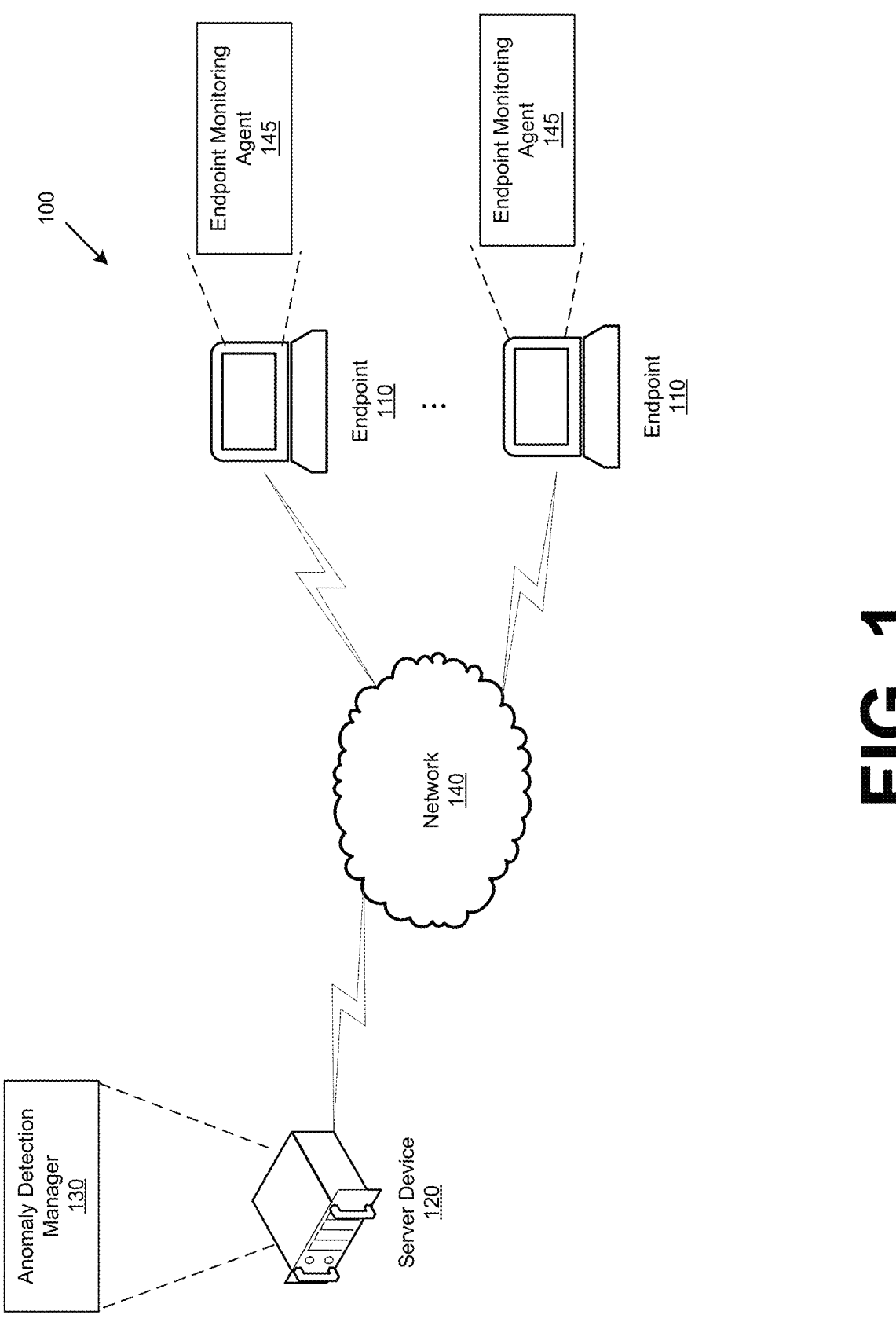
FIG. 1 is a diagram of an example anomaly detection system within a computing environment.

FIG. 1 illustrates an example environment 100 that includes a set of user devices 110 (referred to collectively as "endpoints 110" and individually as "endpoint 110"), a set of server devices 120 (referred to collectively as "server devices 120" and individually as "server device 120"), an anomaly detection manager 130, and a network 140. Devices of environment 100 may interconnect via wired connections, wireless connections, or a combination of wired and wireless connections.

The endpoint 110 includes one or more devices capable of receiving, generating, storing, processing, and/or providing information associated with an account and/or a transaction for which the account is to be used. For example, the endpoint 110 may include a desktop computer, a mobile phone, a laptop computer, a tablet computer, a handheld computer, a gaming device, a wearable communication device, e.g., a smart wristwatch, a pair of smart eyeglasses, etc., or a similar type of device.

The server device 120 includes one or more devices capable of receiving, providing, storing, processing, and/or generating information associated with an account and/or a transaction for which the account is to be used. For example, the server device 120 may include a server (e.g., in a data center or a cloud computing environment), a data center (e.g., a multi-server micro data center), a workstation computer, a virtual machine (VM) provided in a cloud computing environment, or a similar type of device. In some implementations, the server device 120 may include a communication interface that allows the server device 120 to receive information from and/or transmit information to other devices in environment 100.

The anomaly detection manager 130 includes a computing system of one or more devices capable of processing information from and/or transmitting information to the endpoints 110, as described in greater detail below. In an example implementation, as shown in FIG. 1, the server device 120 includes the anomaly detection manager 130. In some examples, the server device 120 may comprise a cloud server or a group of cloud servers. In some implementations, the anomaly detection manager 130 may be designed to be modular, such that certain software components can be swapped in or out depending on a particular need.

In various implementations, the anomaly detection manager 130 communicates with an endpoint monitoring agent 145 residing on the endpoints 110. The endpoint monitoring agent 145 comprises executable software that generates and/or monitors log data and/or files. The generated log data can include certain parameters or attributes associated with security and non-security related events and activities that occur within one or more communication networks, such as the network 140. As discussed in greater detail below, the log data and/or log files can be parsed into primary events that are used to generate graph elements. The log data and/or log files can comprise, but is not limited to, Domain Name System (DNS) traffic, cloud access security broker (CASB) data, Next Generation Firewalls (NGFW) data, intrusion detection system (IDSs) data, endpoint detection and response (EDR) system data, or the like.

The network 140 includes one or more wired and/or wireless networks. For example, the network 140 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
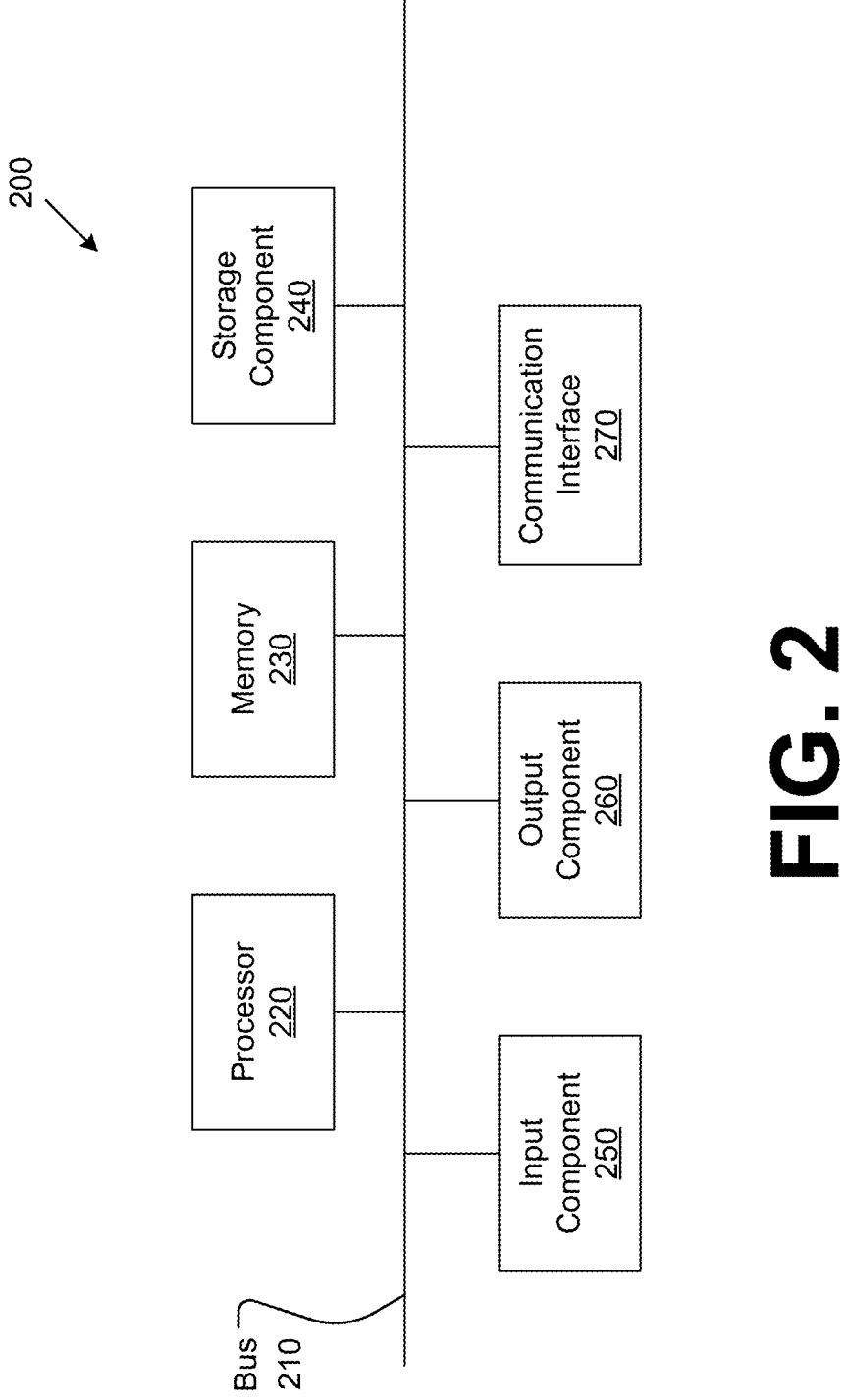
FIG. 2 is a diagram of an example computing device.

FIG. 2 is a diagram of example components of a device 200. The device 200 may correspond to the endpoint 110, the server device 120. In some implementations, the endpoint 110 and/or the server device 120, may include one or more devices 200 and/or one or more components of the device 200. As shown in FIG. 2, the device 200 may include a bus 210, a processor 220, a memory 230, a storage component 240, an input component 250, an output component 260, and a communication interface 270.

The bus 210 includes a component that permits communication among the components of device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random-access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
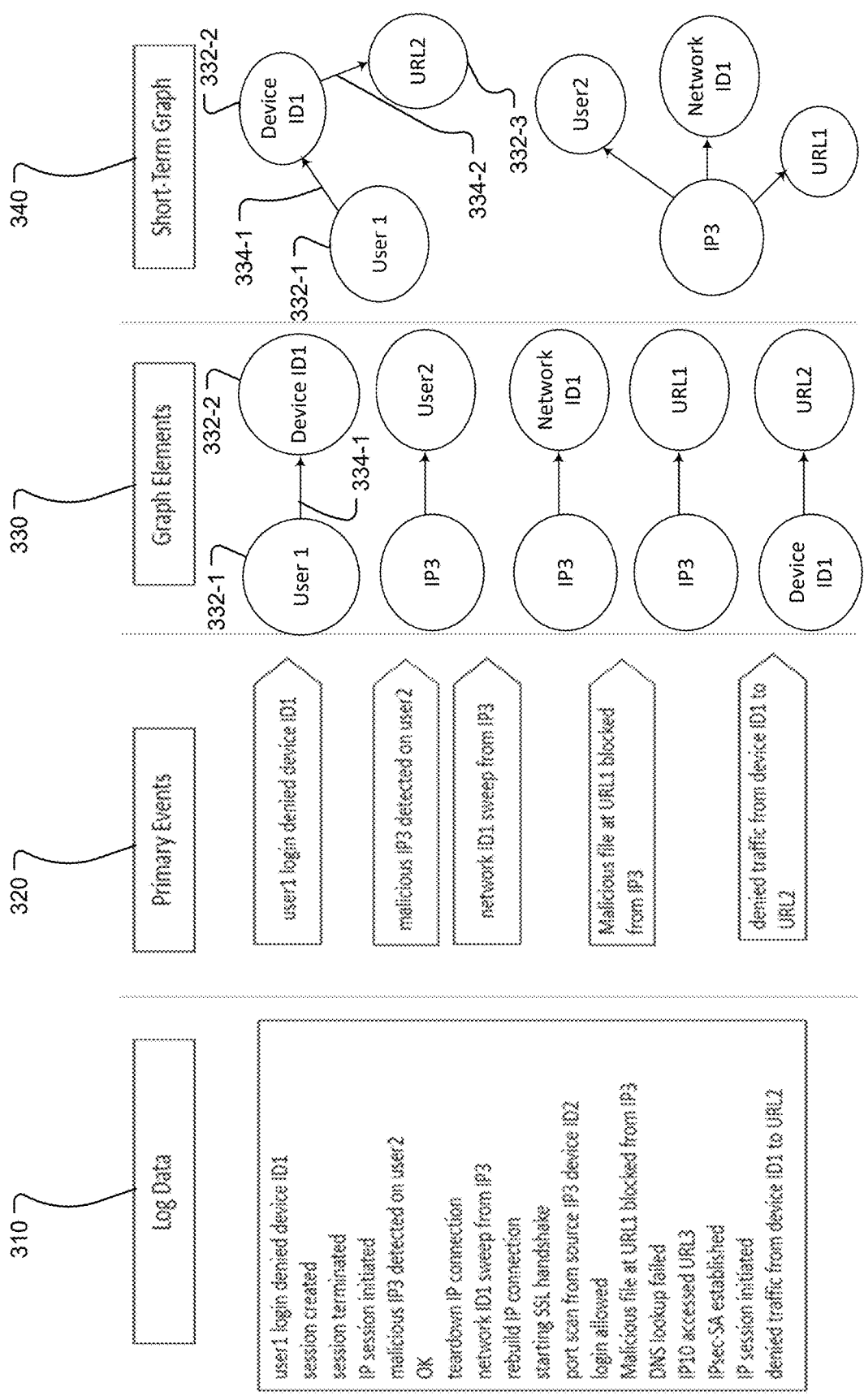
FIG. 3 is a diagram illustrating example log data, primary events, graph elements, and short-term graphs used by the anomaly detection system.

FIG. 3 illustrates example log data 310 obtained from one or more endpoint monitoring agents 145, example primary events 320 parsed from the log data 310, example graph elements 330 generated based on corresponding primary events 320, and example short-term graphs 340 generated based on the graph elements. In various implementations, the log data 310 is received at the anomaly detection manager 130. The anomaly detection manager 130 can store the received log data 310 in a data structure, such as a NoSQL database. The anomaly detection manager 130 parses the log data 310 to generate the primary events 320 using suitable parsing techniques. The parsed log data 310 is used to define the primary events 320 involving one or more entities. The anomaly detection manager 130 can generate one or more graph elements 330 based on one or more relationships, i.e., links, between entities, and the graph elements 330 can be used to construct short-term graphs 340 as shown in FIG. 3. The short-term graphs 340 can further be stored within a data structure, such as a graph database.

As used herein, a "short-term" graph can be comprised of primary events collected over a predefined time period, e.g., thirty minutes, one hour, two hours, four hours, etc., and a "long-term" graph can be comprised of graph elements from "short-term" graphs.

Each graph can comprise multiple nodes 332 that can be connected by an edge 334. Within the present disclosure, entities monitored within a communication network, such as network 140, are represented as nodes 332 and events, e.g., actions, between entities can comprise edges 334.

As shown in FIG. 3, a short-term graph 340 can be constructed from a collection of nodes 332 connected by edges 334 in which a particular node 332 can have one or more relationships with other nodes. For example, a short-term graph 340 can be generated based on a relationship between the node 332-1 representing "user 1," the node 332-2 representing "device ID1" and the node 332-3

"URL2." As shown, nodes 332-1, 332-2 are connected by edge 334-1, and nodes 332-2, 332-3 are connected by edge 334-2.

Figure 4:
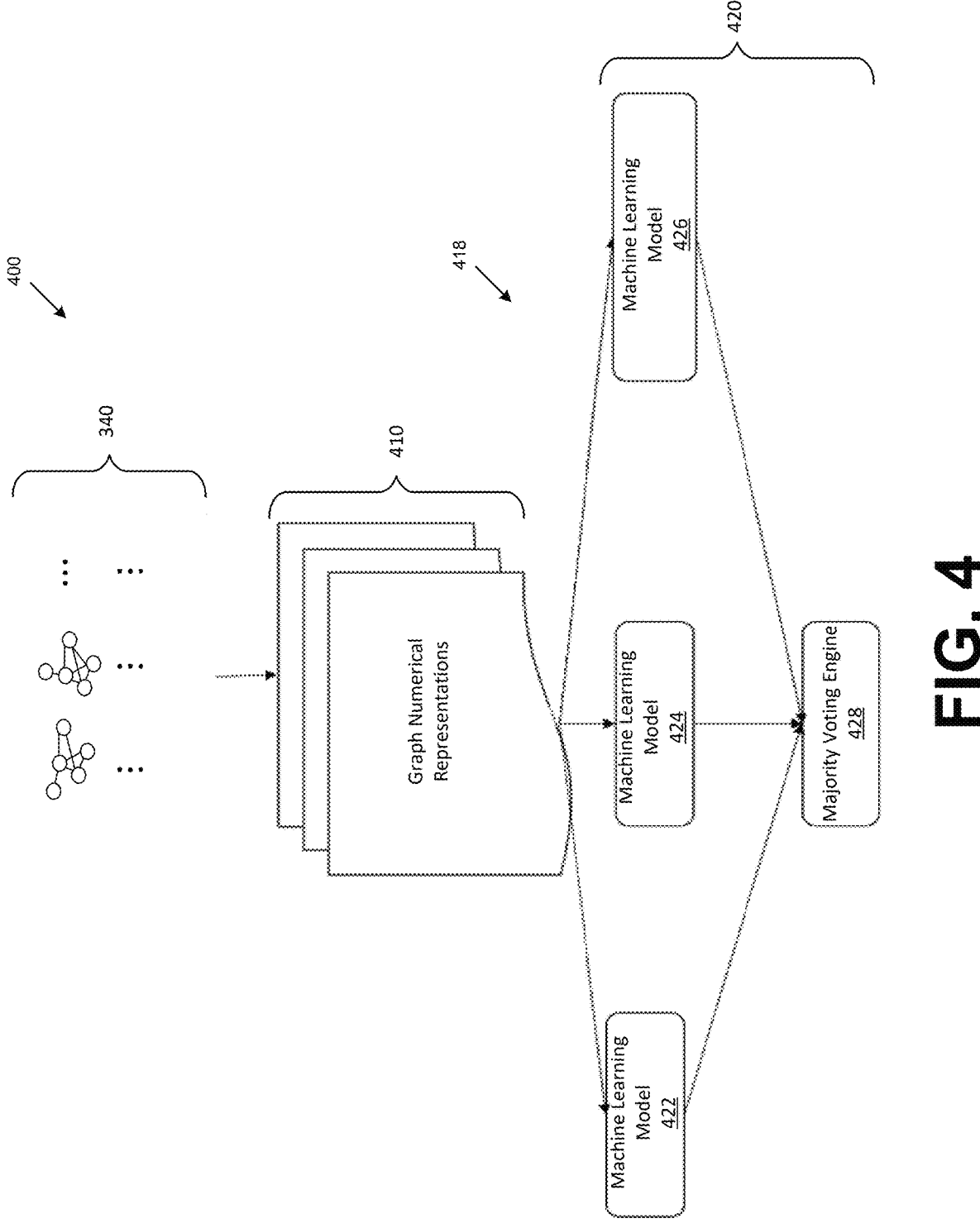
FIG. 4 is a diagram illustrating an example process for determining whether a short-term graph deviates with respect to one or more graph profiles.

FIG. 4 illustrates an example environment 400 for detecting anomalies. As shown, the anomaly detection manager 130 clusters one or more short-term graphs 340 according to the primary events 320 extracted from the log data 310. Further, the anomaly detection manager 130 can determine one or more numerical representations, i.e., vector representations, 410 of the short-term graphs 340. In an example implementation, the anomaly detection manager 130 can determine the numerical representations 410 of the short-term graphs 340 based on a betweenness centrality, a closeness centrality, an Eigenvector centrality, an edge connectivity, a node connectivity, a number of communities, a community size distribution, Node2vec embeddings, Deepwalk embeddings, Deep Neural Networks for Learning Graph Representations (DNGR) embeddings, or the like.

The numerical representations 410 are provided to a machine learning module 418 that identifies outliers, i.e., anomalous network behavior. Within the present context, the short-term graphs 340 corresponding to the numerical representations 410 identified as deviating from a predetermined graph profile can comprise secondary signals indicative of anomalous network behavior. In an example implementations, the machine learning module 418 comprises a machine learning ensemble 420 that includes multiple machine learning models 422, 424, 426. While the machine learning ensemble 420 is illustrated as including machine learning models 422, 424, 426, it is understood that the machine learning ensemble 420 can include additional or fewer machine learning models 422, 424, 426.

The machine learning module 418 determines whether a particular numerical representation 410 of a short-term graph 340 deviates with respect to one or more predefined graph profiles, i.e., a learnt graph profile. For example, the machine learning module 418 uses the machine learning ensemble 420 to determine whether the deviation between the numerical representations 410 and a predetermined graph profile is greater than a predetermined deviation threshold. The machine learning ensemble 420 may determine the deviation using machine learning models 422, 424, 426, which can include, but are not limited to, decision trees, support vector machines, Boltzmann machines, restricted Boltzmann machines, autoencoders, isolation forests, deep support vector data descriptions, and/or clustering algorithms.

The machine learning ensemble 420 may be a repository of machine learning engines, which can comprise a hybrid engine, a homogenous engine, or a heterogeneous engine. The machine learning ensemble 420 is homogenous where the individual machine learning models that make up the ensemble are of the same type. The machine learning ensemble 420 is heterogeneous where the individual machine learning models that make of the ensemble are of different types.

As shown, the machine learning ensemble 420 also includes a majority voting engine 428 that determines whether the short-term graph 340 deviates from the one or more predetermined graph profiles based on the output of the machine learning models 422, 424, 426. The one or more predetermined graph profiles may be generated based on defined non-malicious activities within a communication network.

The anomaly detection manager 130 can calculate a probability of the short-term graph 340 being malicious. In an example implementation, the anomaly detection manager

130 can calculate the probability of the short-term graph 340 being malicious based on the amount of deviation of the short-term graph 340 with respect to the one or more graph profiles.

Figure 5:
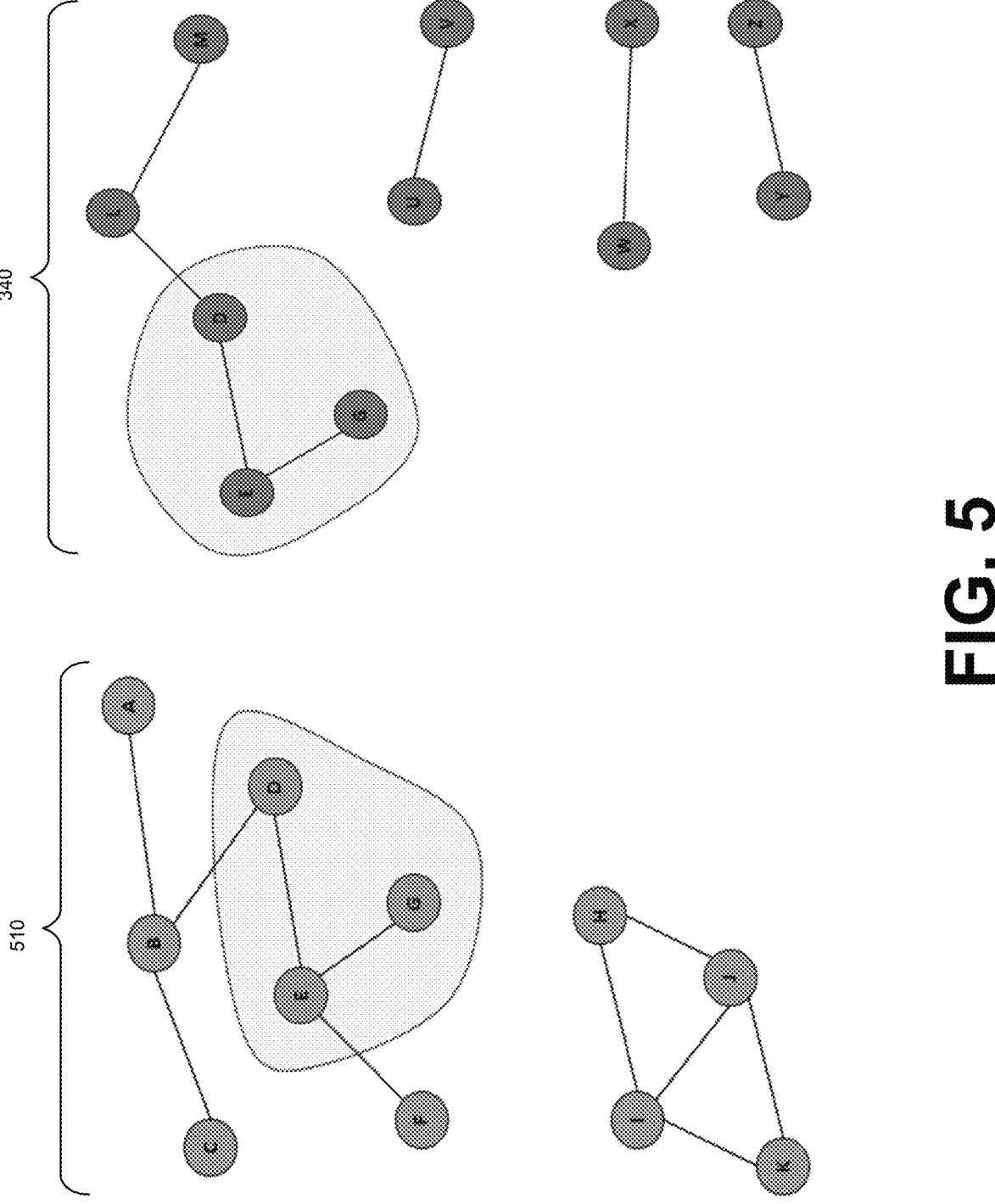
FIG. 5 is a diagram illustrating an example long-term graph and an example short-term graph.
Figure 6:
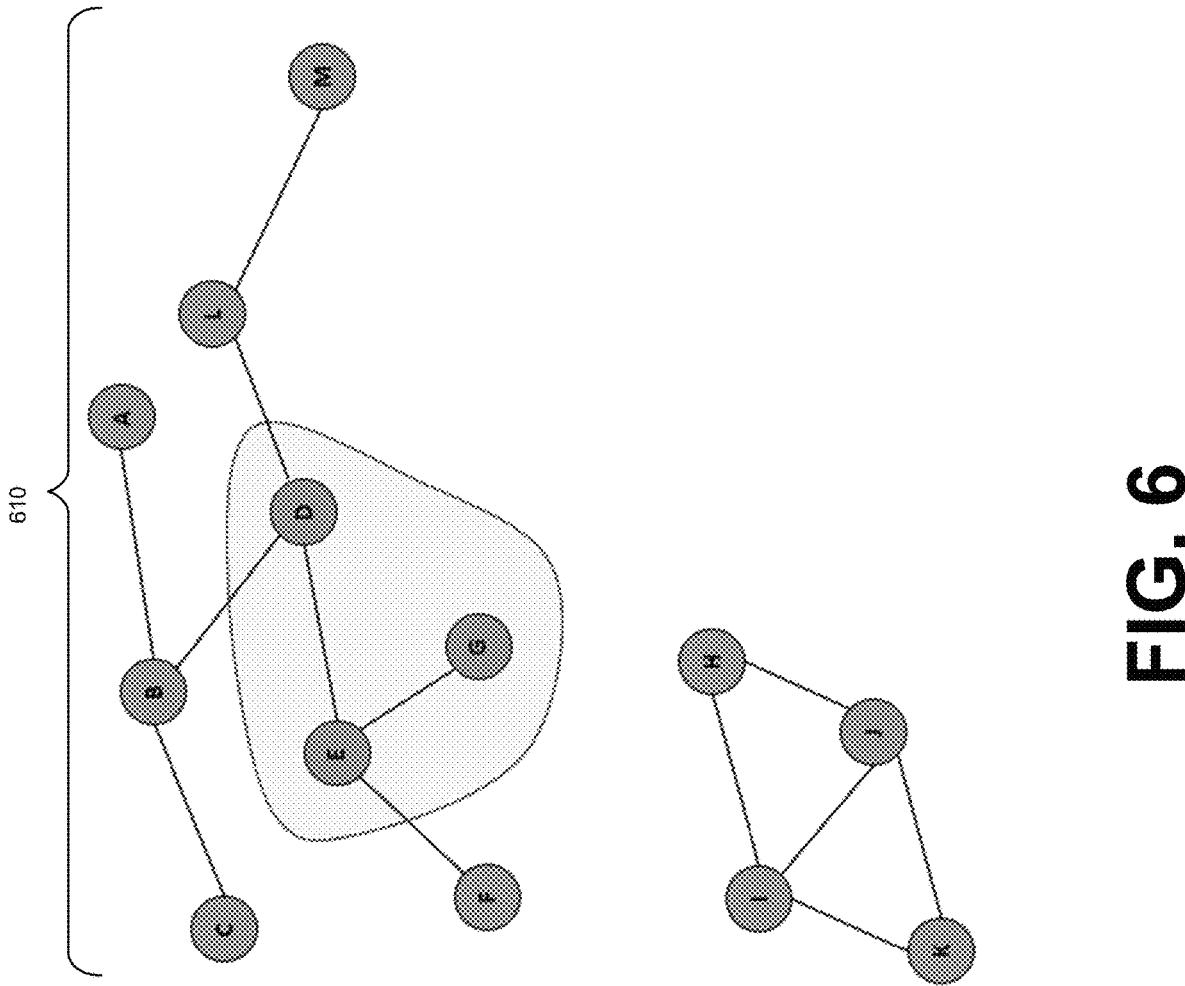
FIG. 6 is a diagram illustrating an example merged long-term graph.

FIG. 5 illustrates an event in which the long-term graph 510 and the short-term graph 340 have some elements in common. For example, the anomaly detection manager 130 can add elements of the short-term graph 340 with a long-term graph 510. As shown, nodes "D," "E," and "G" are common, i.e., overlap, to graphs 340, 510. Referring to FIG. 6, based on the overlap, the anomaly detection manager 130 combines elements of the short-term graph 340 accordingly to form a merged long-term graph 610. The anomaly detection manager 130 can then calculate a probability of the combined elements of the long-term graph 610 as being malicious. In an example implementation, the anomaly detection manager 130 can calculate the maliciousness probability according to Equation 1:

$$P_{new} = \frac{P_{cur} \cdot N_{cur} + p_i \cdot n_i + 0.5 \cdot O \cdot (P_{cur} + p_i)}{N_{cur} + n_i + O}, \qquad \text{Eq. 1}$$

where Pnew is an updated maliciousness probability, Pcur is the probability of the current cluster to be malicious, Ncur is the number of nodes in the current cluster, pi is the probability of the new cluster to be malicious, ni is the number of nodes in the new cluster, and O is the number of nodes common to both current and new clusters. The updated probability associated with modified elements, or a cluster, is stored in a data structure. As discussed herein, the anomaly detection manager 130 can generate an alert when the updated maliciousness probability exceeds a predefined anomaly threshold.

If there are no common nodes, elements of the short-term graph 340 can be added directly to the long-term graph 510. In these instances, the probability associated with added elements, or cluster, is stored in a data structure.

Figure 7:
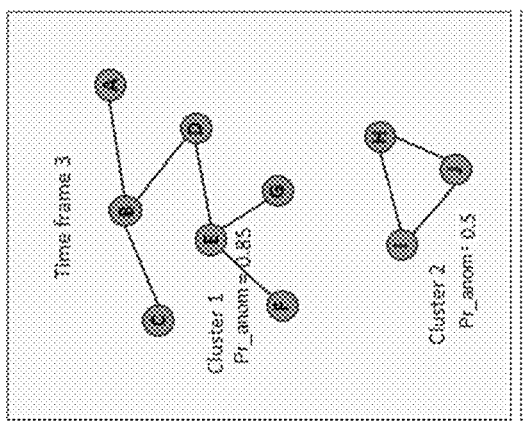
FIG. 7 is diagram illustrating an evolution of a long-term graph over six (6) time frames.
Figure 7:
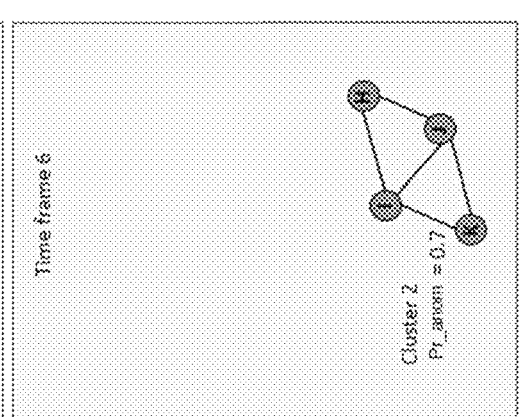
Figure 7:
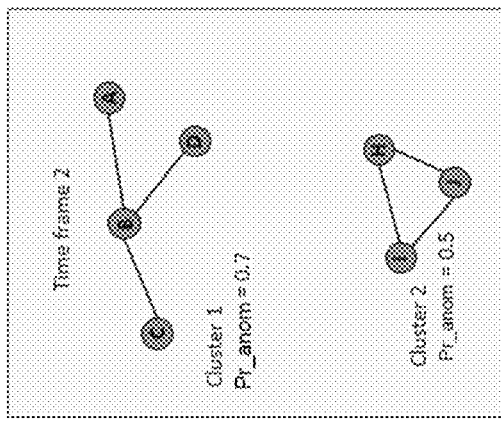
Figure 7:
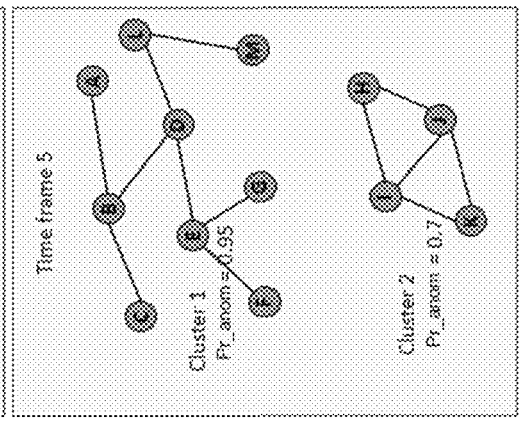
Figure 7:
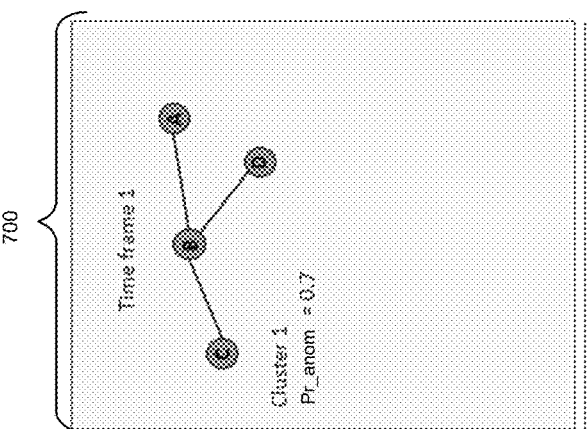
Figure 7:
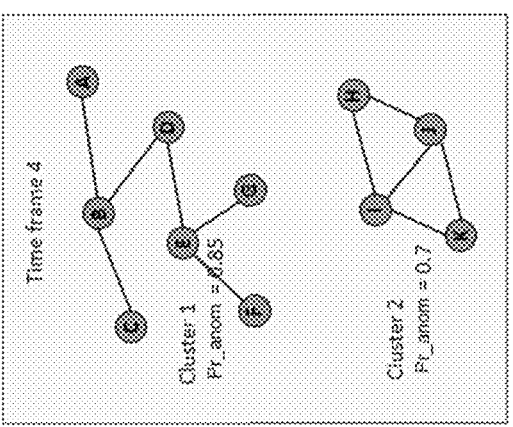

FIG. 7 illustrates an evolution of a long-term graph 700 over six (6) time frames. Referring to time frame one (1), an initial short-term graph and corresponding probability (Pr_anom) is added once the predefined time period has elapsed. The anomaly detection manager 130 can compare the probability with a predefined anomaly threshold. In time frame two (2), another short-term graph and corresponding probability is added to the long-term graph 700. Generally referring to time frames three (3) through five (5), elements of short-term graphs are added to the long-term graph 700 and the corresponding probabilities are calculated. With reference to time frame (5), the anomaly detection manager 130 determines that the probability for cluster one (1) has exceeded the predefined anomaly threshold. In this instance, the anomaly detection manager 130 generates an alert indicating potential malicious activity. In various implementations, the alert can include information pertaining to the specific activity that caused the alert based on the elements added into the long-term graph 700. The portion of the long-term graph 700 that caused the alert can then be deleted from the data structure storing the long-term graph 700. Once deleted, cluster two (2) and its probability are retained for continued processing as illustrated in time frame six (6).

Figure 8:
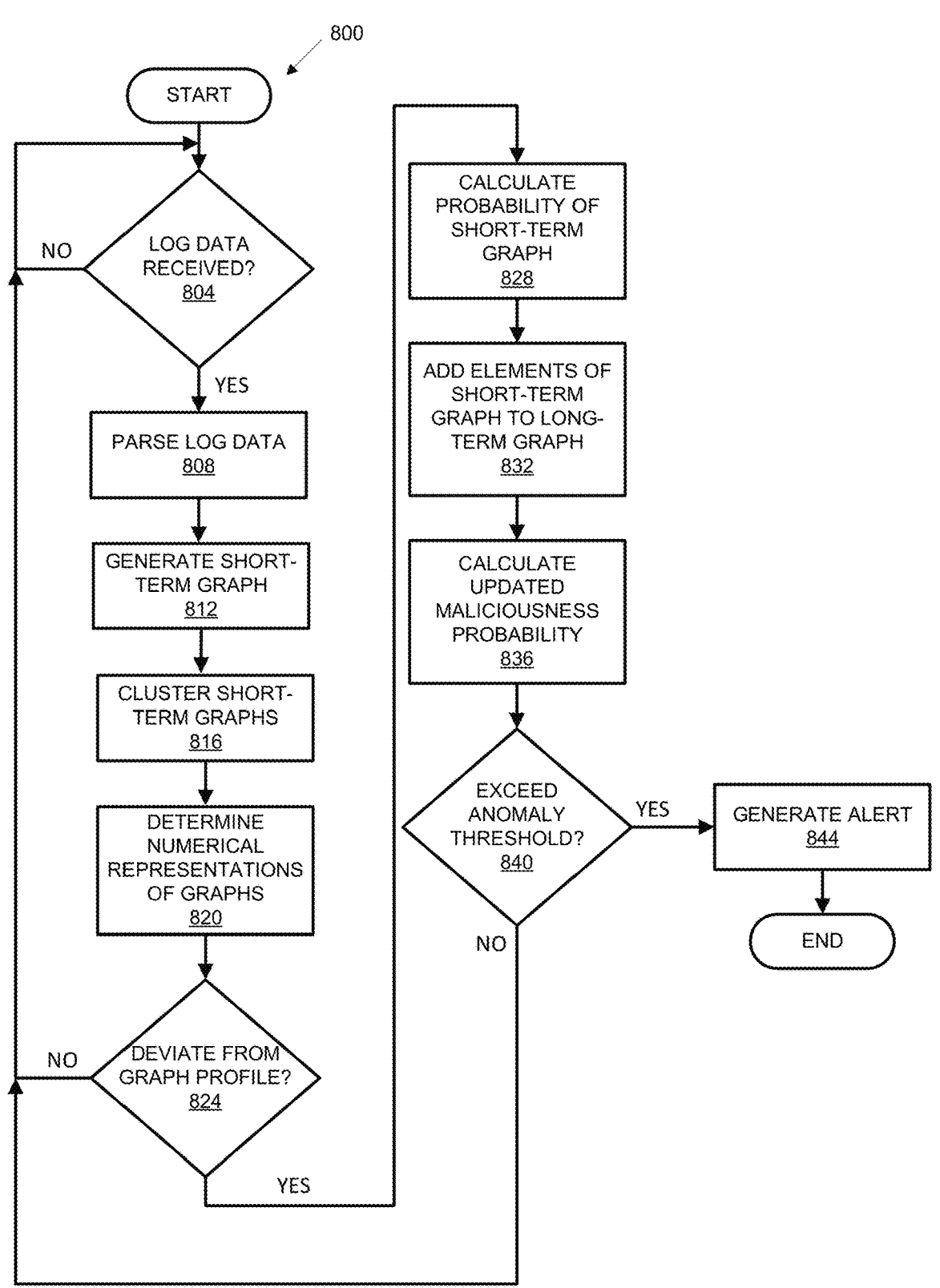
FIG. 8 is a flow diagram illustrating a process for determining whether one more events within a communication network are potentially malicious.

FIG. 8 is a flow chart of an example process 800 for determining whether one or more events within a communication network are potentially malicious. In some implementations, one or more process blocks of FIG. 8 may be performed by the anomaly detection manager 130.

At block 804, the anomaly detection manager 130 determines whether log data 310 has been received. For example, the anomaly detection manager 130 can determine whether log data 310 has been received from one or more endpoint monitoring agents 145. If no, the process 800 returns to block 804. Otherwise, at block 808, the anomaly detection manager 130 parses the log data 310 to determine primary events 320. At block 812, a short-term graph 340 is generated based on the primary events 320. At block 816, multiple short-term graphs 340 are clustered.

At block 820, the anomaly detection manager 130 determines, i.e., calculates, numerical representations 410 of the clustered short-term graphs 340. As discussed above, the numerical representations 410 can comprise vector representations of the clustered short-term graphs 340. At block 824, the anomaly detection manager 130 determines whether the numerical representations 410 of the clustered short-term graphs 340 deviate from one or more predetermined graph profiles. For example, the numerical representations 410 are provided to a machine learning module 418 that is trained to determine whether the numerical representations 410 a deviation between the numerical representations 410 and a predetermined graph profile is greater than a predetermined deviation threshold. If the numerical representations do not deviate from the predetermined graph profiles by a predefined deviation amount, the process 800 returns to block 804.

Otherwise, at block 828, the anomaly detection manager 130 calculates the probability of the short-term graph 340 as being malicious. At block 832, the anomaly detection manager 130 adds elements of the short-term graph 340 to a long-term graph 510. At block 836, the anomaly detection manager 130 calculates an updated maliciousness probability of the updated long-term graph 510 based on the elements added to the long-term graph. At block 840, the anomaly detection manager 130 determines whether the updated maliciousness probability of any subset and/or clusters of the long-term graph exceeds a predefined anomaly threshold. If no, the process 800 returns to block 804. Otherwise, the anomaly detection manager 130 generates an alert indicating potential malicious activity at block 844. The process 800 then ends.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system comprising a computer including a processor and a memory, the memory including instructions such that the processor is programmed to:

construct a short-term graph within a first data structure, wherein the short-term graph comprises nodes representing entities within a communication network and edges representing relationships between the entities;

determine a vector representation of the short-term graph;

determine, using a machine learning ensemble comprising a plurality of different machine learning models and a majority voting engine, whether the vector representation of the short-term graph deviates from a predetermined graph profile by more than a predetermined deviation threshold;

when the deviation exceeds the threshold, update a long-term graph stored in a second data structure by incorporating elements from the short-term graph;

calculate an updated maliciousness probability for clusters within the updated long-term graph;

generate an alert including malicious activity and corresponding entities within the communication network that caused the alert when the updated maliciousness probability exceeds an anomaly threshold;

remove the cluster from the long-term graph after generating the alert; and continuously monitor remaining clusters within the long-term graph by recalculating maliciousness probabilities for the remaining clusters within the long-term graph over subsequent time windows.

2. The system of claim 1, wherein the processor is further programmed to construct the short-term graph within the first data structure based on parsed log data representing primary events occurring within a predefined time window within the communication network.

3. The system of claim 2, wherein the processor is further programmed to receive log data from at least one endpoint monitoring agent.

4. The system of claim 1, wherein the processor is further programmed to calculate the updated maliciousness probability for the clusters according to $P\_new=(P\_cur \cdot N\_cur + p\_i \cdot n\_i + 0.5 \cdot O \cdot (P\_cur + p\_i))/(N\_cur + n\_i + O)$, where $P\_cur$ is current cluster maliciousness probability, $N\_cur$ is number of nodes in current cluster, $p\_i$ is probability of new cluster, $n\_i$ is number of nodes in new cluster, and $O$ is number of overlapping nodes.

5. A method comprising:

constructing a short-term graph within a first data structure, wherein the short-term graph comprises nodes representing entities within a communication network and edges representing relationships between the entities;

determining a vector representation of the short-term graph based on at least one of betweenness centrality, closeness centrality, Eigenvector centrality, edge connectivity, node connectivity, number of communities, or community size distribution;

determining, using a machine learning ensemble comprising a plurality of different machine learning models and a majority voting engine, whether the vector representation of the short-term graph deviates from a predetermined graph profile by more than a predetermined deviation threshold;

when the deviation exceeds the threshold, updating a long-term graph stored in a second data structure by incorporating elements from the short-term graph;

calculating an updated maliciousness probability for clusters within the updated long-term graph;

generating an alert including malicious activity and corresponding entities within the communication network that caused the alert when the updated maliciousness probability exceeds an anomaly threshold;

removing the cluster from the long-term graph after generating the alert; and continuously monitoring remaining clusters within the long-term graph by recalculating maliciousness probabilities for the remaining clusters within the long-term graph over subsequent time windows.

6. The method of claim 5, further comprising constructing the short-term graph within the first data structure based on parsed log data representing primary events occurring within a predefined time window within the communication network.

7. The method of claim 6, the method further comprising receiving log data from at least one endpoint monitoring agent.

8. A system comprising a computer including a processor and a memory, the memory including instructions such that the processor is programmed to:

construct a short-term graph within a first data structure, wherein the short-term graph comprises nodes representing entities within a communication network and edges representing relationships between the entities;

determine a vector representation of the short-term graph based on at least one of betweenness centrality, closeness centrality, Eigenvector centrality, edge connectivity, node connectivity, number of communities, or community size distribution;

determine, using a machine learning ensemble comprising a plurality of different machine learning models and a majority voting engine, whether the vector representation of the short-term graph deviates from a predetermined graph profile by more than a predetermined deviation threshold;

when the deviation exceeds the threshold, update a long-term graph stored in a second data structure by incorporating elements from the short-term graph;

calculate an updated maliciousness probability for clusters within the updated long-term graph;

generate an alert including malicious activity and corresponding entities within the communication network that caused the alert when the updated maliciousness probability exceeds an anomaly threshold;

remove the cluster from the long-term graph after generating the alert; and continuously monitor remaining clusters within the long-term graph by recalculating maliciousness probabilities for the remaining clusters within the long-term graph over subsequent time windows.

9. The system of claim 8, wherein the processor is further programmed to construct the short-term graph within the first data structure based on parsed log data representing primary events occurring within a predefined time window within the communication network.

10. The system of claim 9, wherein the processor is further programmed to receive log data from at least one endpoint monitoring agent.

11. The system of claim 8, wherein the processor is further programmed to calculate the updated maliciousness probability for the clusters according to $P\_new=(P\_cur \cdot N\_cur + p\_i \cdot n\_i + 0.5 \cdot O \cdot (P\_cur + p\_i))/(N\_cur + n\_i + O)$, where $P\_cur$ is current cluster maliciousness probability, $N\_cur$ is number of nodes in current cluster, $p\_i$ is probability of new cluster, $n\_i$ is number of nodes in new cluster, and $O$ is number of overlapping nodes.

* * * * *